US008649446B2

(12) United States Patent
Kim et al.

(10) Patent No.: US 8,649,446 B2
(45) Date of Patent: Feb. 11, 2014

(54) SYSTEM AND METHOD FOR CHANNEL CLASSIFICATION

(75) Inventors: Taejoon Kim, Berkeley, CA (US); Timothy M. Schmidl, Dallas, TX (US); Tarkesh Pande, Dallas, TX (US); Anuj Batra, Dallas, TX (US); June Chul Roh, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 271 days.

(21) Appl. No.: 13/284,745

(22) Filed: Oct. 28, 2011

(65) Prior Publication Data
US 2012/0106609 A1 May 3, 2012

Related U.S. Application Data

(60) Provisional application No. 61/408,000, filed on Oct. 29, 2010.

(51) Int. Cl.
*H04L 27/00* (2006.01)
(52) U.S. Cl.
USPC ........ 375/259; 375/224; 375/316; 455/67.11; 455/226.1; 370/241

(58) Field of Classification Search
USPC ......... 375/224, 228, 259–260, 285, 316, 340; 455/67.11, 226.1; 370/206, 241
See application file for complete search history.

(56) References Cited

U.S. PATENT DOCUMENTS

| | | | |
|---|---|---|---|
| 7,079,569 B1* | 7/2006 | Hayata | 375/147 |
| 2006/0067441 A1* | 3/2006 | Park et al. | 375/346 |
| 2007/0133695 A1* | 6/2007 | Kotzin | 375/260 |
| 2008/0132297 A1* | 6/2008 | Carsello et al. | 455/574 |
| 2009/0323843 A1* | 12/2009 | Yang et al. | 375/260 |
| 2010/0226423 A1* | 9/2010 | Chen et al. | 375/232 |

* cited by examiner

*Primary Examiner* — Jean B Corrielus
(74) *Attorney, Agent, or Firm* — John R. Pessetto; Wade J. Brady, III; Frederick J. Telecky, Jr.

(57) ABSTRACT

A system and method for classifying a channel with regard to delay spread in a wireless network applying orthogonal frequency division multiplexing. In one embodiment, a wireless receiver includes a channel classifier. The channel classifier is configured to compute a channel estimate corresponding to a channel traversed by a packet received by the wireless receiver. The channel classifier is also configured to partition the channel estimate into a plurality of windows. Each window corresponds to a range of time of the channel estimate. The channel classifier is further configured to assign a delay spread classification to the channel based on a distribution of energy across the windows.

17 Claims, 3 Drawing Sheets

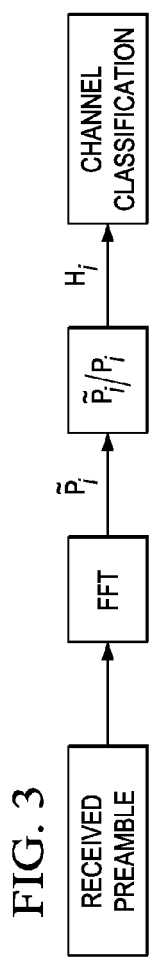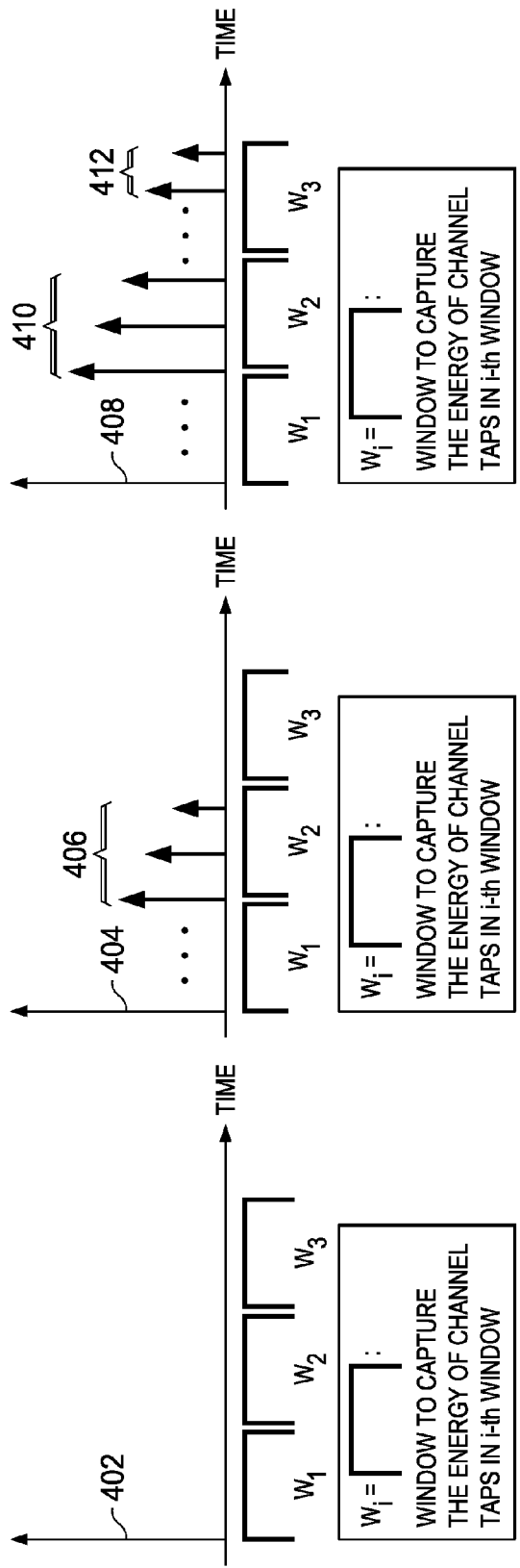

SYSTEM AND METHOD FOR CHANNEL CLASSIFICATION

CROSS-REFERENCE TO RELATED APPLICATION

The present application claims priority to U.S. Provisional Patent Application No. 61/408,000, filed on Oct. 29, 2010; which is hereby incorporated herein by reference in its entirety.

BACKGROUND

Wireless personal area networks (WPANs) are used to convey information over relatively short distances. A WPAN may transfer data at a relatively low rate to minimize power consumption. Unlike wireless local area networks (WLANs), WPANs employ little or no infrastructure. Consequently, WPANS allow small, power-efficient, and inexpensive solutions to be implemented for a wide range of devices.

Smart Utility Networks (SUNs) are one application of WPAN technology. A SUN may operate either over short ranges such as in a mesh network where utility meter information is sent from one utility meter to another, or over longer ranges such as in a star topology where utility meter information is sent to a pole-top collection point. The terms WPAN and SUN are used interchangeably herein.

In wireless communications systems such as SUNs, transmissions between devices encounter a variety of reflective surfaces (buildings, vehicles, mountains, etc.). Wireless receivers apply a variety of techniques to suppress and/or make use of the multipath signals created by the reflective surfaces.

SUMMARY

A system and method for classifying a channel with regard to delay spread in a wireless network applying orthogonal frequency division multiplexing. In one embodiment, a wireless receiver includes a channel classifier. The channel classifier is configured to compute a channel estimate corresponding to a channel traversed by a packet received by the wireless receiver. The channel classifier is also configured to partition the channel estimate into a plurality of windows. Each window corresponds to a range of time of the channel estimate. The channel classifier is further configured to assign a delay spread classification to the channel based on a distribution of energy across the windows.

In another embodiment, a method includes receiving, by a wireless device, an orthogonal frequency division multiplexed packet. A channel estimate corresponding to a channel traversed by a packet between the wireless device and a source device is computed. The channel estimate is partitioned into a plurality of windows. Each window represents a range of time of the channel estimate. A delay spread classification is assigned to the channel based on a distribution of energy over the windows.

In a further embodiment, a system includes a wireless device. The wireless device is configured to receive an orthogonal frequency division multiplexed packet via a wireless channel and to categorize the channel in terms of delay spread. The categorization is based on symbols extracted from the packet. The wireless device includes a channel classifier that performs the categorization. The channel classifier is configured to compute, based on the symbols, a channel estimate. The channel classifier is also configured to partition the channel estimate into a plurality of windows. Each window represents a range of time of the channel estimate. The channel classifier is further configured to compute an energy level for each window; and to categorize the channel based on relative energy levels of the windows.

BRIEF DESCRIPTION OF THE DRAWINGS

For a detailed description of exemplary embodiments of the invention, reference will now be made to the accompanying drawings in which:

FIG. 3 shows a generic channel classification sequence in accordance with various embodiments;

FIGS. 4A-4C show illustrations of channel classification in the time domain in accordance with various embodiments;

NOTATION AND NOMENCLATURE

Figure 1:
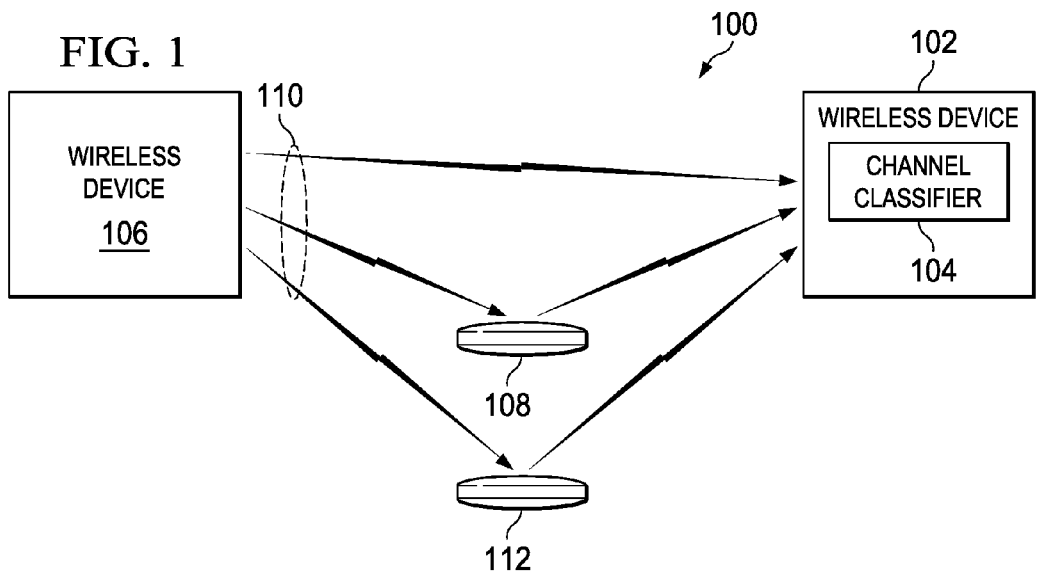
FIG. 1 shows a block diagram of a communication network including a wireless device with a channel classifier in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A utility network or smart utility network (SUN) is a low-rate (e.g., 40 kbps to 1 Mbps) low-power wireless personal area network (WPAN) that is specifically designed for use in utility metering applications such as transmitting electric, gas, water usage, and other like data from the customer premises to a data collection point operated by the utility. For example, utility meters are installed for each house in a residential neighborhood, and the usage data is sent periodically from each utility meter to a data collection point, which is an element of the SUN. The data collection point is connected by fiber, copper wire, or wireless connection to a central office that collects all the usage data for a region. Usage data is sent either directly from each utility meter to the collection point or from utility meter to utility meter until the collection point is reached in a star or network formation, respectively.

Orthogonal frequency division multiplexing (OFDM) spreads a data stream across a large number of orthogonal sub-carriers. The sub-carriers allow for reduced modulation rates and can enhance signal reliability in multipath environments. OFDM is used in a variety of wireless communication systems, including SUNs.

Wireless systems apply various techniques to improve performance. For example, some wireless receivers average received signals to, for example, improve the signal-to-noise ratio. The effectiveness of such techniques may be related to the degree of delay spread induced by the wireless channel traversed by the signals. Thus, proper classification of the channel, with regard to delay spread, can be an important criterion for determining how received signals are to be processed.

Embodiments of the present disclosure apply novel low complexity techniques for efficiently differentiating different types of multi-path fading channels in OFDM systems. Embodiments advantageously implement channel classification without the use of singular value decomposition or inverse Fourier transforms. Consequently, the techniques disclosed herein are suitable for use in low-power applications, such as SUNs, where both long battery life and bit error rate are important. Embodiments of the channel classifier presented here may also be generic in the sense that their resolution can be tuned based on the type of multi-path fading channels that are expected to be encountered.

FIG. 1 shows a block diagram of a communication network 100 including a wireless device 102 with a channel classifier 104 in accordance with various embodiments. The system 100 includes wireless devices 102 and 106. The wireless devices 102 and 106 are configured to transmit and/or receive OFDM signals. Though only two wireless devices 102, 106 are shown, in practice the system 100 may include any number of wireless devices. In some embodiments, the wireless devices 102, 106 may be SUN devices in accordance with the IEEE 802.15.4 standard.

The wireless device 106 transmits signal 110 for reception by the wireless device 102. The signal 110 is reflected by the reflectors 108, 112, the wireless device 102 receives multiple copies of the transmitted signal 110 at times determined by the relative location of the wireless devices 102, 106 and the reflectors 108, 112.

The wireless device 102 includes a channel classifier 104 that analyzes the delay spread of the wireless channel traversed by the signal 110, and assigns the channel to one of a number of predetermined channel classes. For example, one embodiment of the channel classifier 104 may broadly categorize the channels as high, medium, low, or no delay spread channels. Where high, medium, low, and no delay spread channels may be respectively encountered in hilly terrain, downtown areas, suburban areas, and rural areas.

In some embodiments, where the channel is a two-tap channel, the second channel tap may be known to always be far from the first tap, and the channel classifier 104 may apply a classification algorithm that differentiates only between a low delay spread channel and a high delay spread channel. Other embodiments of the channel classifier 104, may include any number of predetermined channel classifications, and differentiate between channels having delay spread corresponding to each classification.

Figure 2:
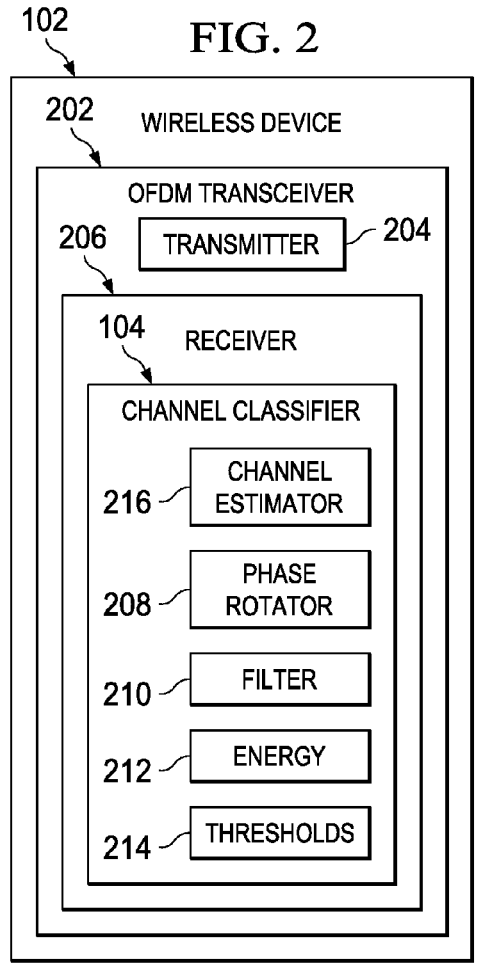
FIG. 2 shows a block diagram of a wireless device including a channel classifier in accordance with various embodiments.

FIG. 2 shows a block diagram of the wireless device 102. The wireless device 102 includes an OFDM transceiver 202 for wirelessly transmitting and/or receiving OFDM signals. The OFDM transceiver 202 includes an OFDM transmitter 204 and an OFDM receiver 206. The OFDM transmitter 204 includes components for transmitting an OFDM signal, such as amplifiers, D/A converters, filters, a cyclic prefix generator, an inverse Fourier transformer, pilot tone generators, preamble generators, encoders, modulators, etc.

The OFDM receiver 206 includes components for receiving a wirelessly transmitted OFDM signal, such as amplifiers, filters, digitizers, a Fourier transformer, demodulators, decoders, symbol detectors, etc. The receiver 206 also includes the channel classifier 104. The channel classifier 104 includes a channel estimator 216, a phase rotator 208, a filter 210, an energy calculator 212, and thresholding logic 214. The channel classifier 104 of FIG. 2 is configured to perform channel classification using frequency domain channel estimates. Other embodiments of the channel classifier 104 may be configured to perform channel classification using time domain channel estimates.

FIG. 3 shows a generalized channel classification sequence performed by the channel classifier 104 in accordance with various embodiments. In the OFDM wireless network 100, each packet includes, at the start of the packet, a preamble or pilot sequence that is used by channel estimator 216 to estimate the channel. The preamble sequence in the frequency domain is known to both the transmitting device 106 and receiving device 102. The known preamble sequence in the frequency domain is denoted as $P_i$ for $i=1 \ldots N_{sub}$ where $N_{sub}$ denotes the number of subcarriers. The channel estimator 216 processes the received preamble to obtain the channel estimates $H_i$ for $i=1 \ldots N_{sub}$ and for classifying the channel type. The channel classifier 104 converts the received preamble to frequency domain preamble $\tilde{P}_i$, and equalizes $\tilde{P}_i$ with the known preamble sequence $P_i$ generate the estimated channel $H_i$ for $i=1 \ldots N_{sub}$. The channel classifier 104 classifies the channel based on the estimated channel $H_i$.

As noted above, some embodiments of the channel classifier 104 classify the channel based on the time-domain channel impulse response. When the time domain channel impulse response is available, some embodiments may also measure the level of power delay spread of the channel in the time domain. The channel classifier 104 estimates time domain channel impulse response by taking an inverse frequency transform (e.g., inverse fast Fourier transform) of $H_i$ (the frequency domain channel estimate).

FIGS. 4A-4C shows illustrations of channel classification in the time domain in accordance with various embodiments.

The channel classifier 104 applies a time domain windowing approach. FIGS. 4A-4C show channel classifier 104 applying three non-overlapping time windows $W_1$-$W_3$ in one embodiment. The windows can be any type of symmetric window (e.g., rectangular window, raised cosine window, Kaiser window, etc.), and all of windows $W_1$-$W_3$ are of the same type (i.e., windows are rectangular, raised cosine, Kaiser, etc.). The coefficients of the time domain channel estimate are assigned to a corresponding time window. The channel classifier 104 measures the energy in each window, and assigns the channel to a spread delay class based on the measured energy in each window. The channel classifier 104 may compare the measured energy in each window to a threshold value to identify energy sufficient for classification.

In FIG. 4A, the energy 402 in window $W_1$ is sufficient to exceed the threshold, and the energy in windows $W_2$ and $W_3$ is below the threshold. Consequently, the channel classifier 104 may deem the channel of FIG. 4A to be a no delay spread channel.

In FIG. 4B, the energy 404 in window $W_1$ and the energy 406 in window $W_2$ are sufficient to exceed the threshold, and the energy in window $W_3$ is below the threshold. Consequently, the channel classifier 104 may deem the channel of FIG. 4B to be a medium delay spread channel because the channel taps are distributed across two windows.

In FIG. 4C, the energies 408, 410, and 412 in windows $W_1$-$W_3$ are sufficient to exceed the threshold. Consequently, the channel classifier 104 may deem the channel of FIG. 4C to be a high delay spread channel because the channel taps are spread across three windows. Similarly, if the energies captured in windows $W_1$ and $W_3$ are above the threshold, and the energy in window $W_2$ is below the threshold, then the channel may be deemed a high delay spread channel because of the time separating the high energy windows.

The operations of the time domain embodiment of the channel classifier 104 can be equivalently performed by the frequency domain embodiment of the channel classifier 104 depicted in FIG. 2. Windowing in the time domain is equivalent to filtering in the frequency domain. The filter 210 of the channel classifier 104 applies a frequency domain filter which is generated by transforming a symmetric window $W_i$ to the frequency domain.

$$W_i \xleftrightarrow{F} R_i$$

The phase rotator 208 multiplies the frequency domain channel estimates generated by the channel estimator 216 by a phase ramp so as to center the channel estimates in the window. Rotating the phase of frequency domain preamble $\tilde{P}_i$, where the amount of the phase rotation is determined by half of the window length, is equivalent to adjusting fast Fourier transform placement in the time domain to center the window.

Rather than applying a different filter for each disjoint window, the channel classifier 104 applies a single filter denoted R. The classifier 104 reduces the number of filters by constraining the window length $|W_i|$ such that $M=|W_i|=|W_j|$ for $i \neq j$.

In the channel classifier 104 of FIG. 2, the channel estimator 216 generates frequency domain channel estimates $H_i$ for $i=1 \ldots N_{sub}$ based on a received packet preamble (e.g., based on training fields of the preamble). The phase rotator 208 includes K phase rotators (i.e., a phase ramp). The phase rotator 208 multiplies the channel estimates by the phase ramp. The amount of the phase rotation for the kth ($k \in \{1, 2, \ldots K\}$) rotator is given by $$(k-1)M + \frac{M}{2}.$$

The filter 210 filters or convolves the output of the phase rotator 208 by a single filter R. The energy calculator 212 determines the energy of the filtered output of the kth phase rotator as $PW_k$. The channel classifier 104 applies the energies $\{PW_k\}_{k=1:K}$ captured in each phase rotator (i.e., in each window) as decision statistics upon which the channel classification is based.

The thresholding logic 214 includes the threshold values against which the energy in each window is compared. The thresholding logic 214 applies the threshold values to the windows to characterize the channel in terms of delay spread. Embodiments of the thresholding logic 214 can apply any of a variety of classification techniques to the window energies. In one embodiment, the thresholding logic 214 compares the energies $\{PW_k\}_{k=1:K}$ to threshold values without additional manipulation, and determines the channel class based on the results of the comparison. For example, based on the distance between the windows containing energy above the applied threshold.

Embodiments of the channel classifier 104 may partition the estimated channel into any number of windows. If the channel estimate is partitioned into a large number of windows, then the thresholding logic 214 may sum the energies of adjacent windows to reduce the number of threshold comparisons (i.e., decimate the windows). Thus, given L levels of bins $1 \leq K_1 < K_2 < \ldots < K_L = K$, the channel classifier 104 can compute summed energies $$S_{K_1} = \sum_{k=1}^{K_1} PW_k, S_{K_2} = \sum_{k=K_1+1}^{K_2} PW_k, \ldots, S_{K_L} = \sum_{k=K_{L-1}+1}^{K_L} PW_k$$

for L bins. The thresholding logic 214 then compares threshold values to $\{S_{K_l}\}_{l=1:L}$ and determines channel class based on the results of the comparisons.

In some embodiments, the thresholding logic 214 evaluates the energies in the windows $\{PW_k\}_{k=1:K}$. The thresholding logic 214 identifies the window containing the maximum energy of the $\{PW_k\}_{k=1:K}$ windows, denoted $PW_{(1)}$ where (1) denotes the phase rotator index of the maximum energy window. The thresholding logic 214 treats the maximum energy window $PW_{(1)}$ as the first window, and discards windows preceding the maximum energy window (i.e., windows with $k<(1)$). The thresholding logic 214 rearranges the windows not discarded, such that $PW_1=PW_{(m)}$, $PW_2=PW_{(m)+1}, \ldots$, $PW_{K-(m)+1}=PW_K$, $PW_{K-(m)+2}=0, \ldots, PW_K=0$. The thresholding logic 214 applies the threshold values to the rearranged windows, and based on the results of the threshold comparisons, classifies the channel. The thresholding logic 214 may also sum adjacent windows prior to threshold application as described above.

Some embodiments of the thresholding logic 214 evaluate the energies in the windows $\{PW_k\}_{k=1:K}$, and identify the two windows containing the highest energies of the $\{PW_k\}_{k=1:K}$ windows. The thresholding logic 214 measures the distance between the two windows, identifies highest energy windows, and classifies the channel based on the distance. The distance may be defined by the difference between phase rotator values of two highest energy windows, i.e., $d_{12}=|\text{position of window 1}-\text{position of window 2}|$.

Various components of the wireless device 102 including at least some portions of the channel classifier 104, including the phase rotator 208, the filter 210, the energy calculator 212, and thresholding logic 214 can be implemented using a processor in the wireless device 102 executing software programming that causes the processor to perform the operations described herein. In some embodiments, the channel classifier 104 includes a processor executing software programming that causes the processor to partition the estimated channels for OFDM subcarriers into windows, compute the energy in each window, and classify each channel as into one of a plurality of predefined categories based on the energies. The partitioning and classification may apply one or more of the techniques disclosed herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

Software programming that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof. Those skilled in the art understand that processors execute software instructions, and that software instructions alone are incapable of performing a function. Therefore, any reference to a function performed by software, or to software performing a function is simply a shorthand means for stating that the function is performed by a processor executing the software, or a processor executing the software performs the function.

Some embodiments can implement portions of the wireless device 102, including portions of the channel classifier 104 using dedicated circuitry (e.g., dedicated circuitry implemented in an integrated circuit). Some embodiments may use a combination of dedicated circuitry and a processor executing suitable software. For example, some portions of the channel classifier 104 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 5:
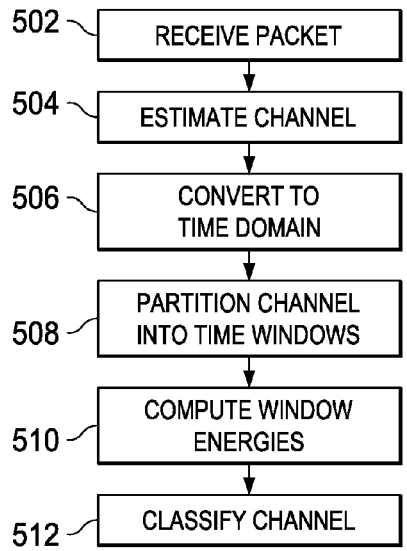
FIG. 5 shows a flow diagram for a method for channel classification in the time domain in accordance with various embodiments.

FIG. 5 shows a flow diagram for a method 500 for channel classification in the time domain in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, can be performed by the wireless device 102, or by a processor of the wireless device 102 executing instructions stored in a computer readable medium.

In block 502, the wireless device 102 receives an OFDM packet. As the packet traverses the wireless medium from the transmitting device to the wireless device 102, the transmitted signal encounters various reflectors that cause the wireless device 102 to receive multiple copies of the packet with varying delay. The wireless device 102 includes a channel classifier 104 to categorize the channel associated with each subcarrier of the packet with regard to delay spread.

In block 504, the wireless device 102 estimates the channels for the subcarriers of the packet. The wireless device 102 may base the channel estimates on symbols extracted from the preamble of the packet (e.g., symbols of a training field) that are known beforehand to the wireless device 102. The wireless device 102 applies a frequency domain transform (e.g., a fast Fourier transform (FFT)) to the preamble symbols, and equalizes the preamble symbols with the known preamble symbol sequence to generate the channel estimates.

In block 506, the wireless device 102, converts the frequency domain channel estimates to the time domain. For example, the wireless device 102 may apply an inverse FFT (IFFT) to the channel estimates.

In block 508, the wireless device 102 partitions each estimated time domain channel into a plurality of sequential non-overlapping time windows. The number of windows and the length of each window can vary.

In block 510, the wireless device determines the energy contained in each window. For example, the wireless device may compute the total power of the channel coefficients associated with each window.

In block 512, wireless device 102 classifies the channels in terms of delay spread based on the energies contained in each window. For example, based on the distribution of energy across the windows, a channel may be classified as a high, medium, low, or no delay spread channel.

Figure 6:
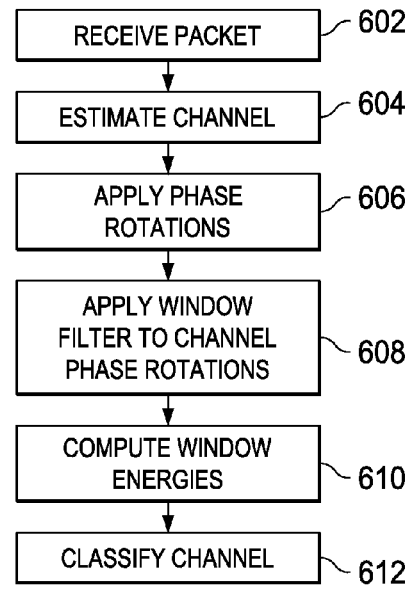
FIG. 6 shows a flow diagram for a method for channel classification in the frequency domain in accordance with various embodiments.

FIG. 6 shows a flow diagram for a method 600 for channel classification in the frequency domain in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be performed by the wireless device 102, or by a processor of the wireless device 102 executing instructions stored in a computer readable medium.

In block 602, the wireless device 102 receives an OFDM packet. As the packet traverses the wireless medium from the transmitting device to the wireless device 102, the transmitted signal encounters various reflectors that cause the wireless device 102 to receive multiple copies of the packet with varying delay. The wireless device 102 includes a channel classifier 104 to categorize the channel associated with each subcarrier of the packet with regard to delay spread.

In block 604, the wireless device 102 estimates the channels for the subcarriers of the packet. The wireless device 102 may base the channel estimates on symbols extracted from the preamble of the packet (e.g., symbols of a training field) that are known beforehand to the wireless device 102. The wireless device 102 applies a frequency domain transform (e.g., an FFT) to the preamble symbols, and equalizes the preamble symbols with the known preamble symbol sequence to generate the channel estimates.

In block 606, the wireless device 102, applies phase rotations that form a phase ramp to the channel estimates. A windowing filter is applied to the phase rotated channel estimates to partition the channel estimates into windows in block 608.

In block 610, the wireless device determines the energy contained in each window. For example, the wireless device 102 may compute the total power for the output of the filter applied to each phase rotated channel estimate where each filter output corresponds to window of the estimated channel.

In block 612, wireless device 102 classifies the channels in terms of delay spread based on the energies contained in each window.

Figure 7:
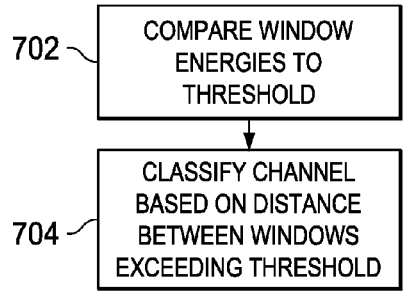
FIG. 7 shows a flow diagram for a method for channel classification based on thresholds in accordance with various embodiments.

FIG. 7 shows a flow diagram for a method 700 for channel classification based on thresholds in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 700, as well as other operations described herein, can be performed by the wireless device 102, or by a processor of the wireless device 102 executing instructions stored in a computer readable medium. The method 700 may be applied to classify a channel in blocks 512, 612 of methods 500, 600.

In block 702, the wireless device 102 compares the energies contained in a plurality of windows to a threshold value. The wireless device 102 classifies the channel, in block 704, based on the results of the comparisons. For example, the wireless device 102 may classify the channel based on the distance between the most distant windows containing energy that exceeds the threshold.

Figure 8:
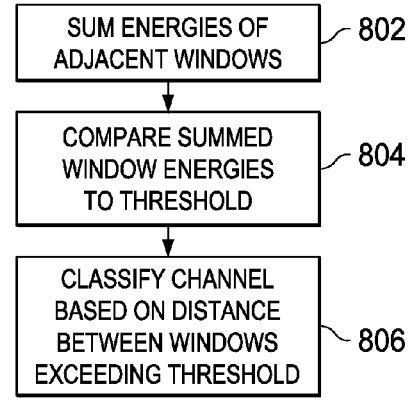
FIG. 8 shows a flow diagram for a method for channel classification based on window summation and thresholding in accordance with various embodiments.

FIG. 8 shows a flow diagram for a method 800 for channel classification based on window summation and thresholding in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 800, as well as other operations described herein, can be performed by the wireless device 102, or by a processor of the wireless device 102 executing instructions stored in a computer readable medium. The method 800 may be applied to classify a channel in blocks 512, 612 of methods 500, 600.

In the method of FIG. 800, the wireless device 102 has partitioned an estimated channel into a greater number of windows than the number of windows to which thresholding is to be applied. In block 802, the wireless device 102 reduces the number of windows to be compared to a threshold value by summing energies contained in adjacent windows. For example, energies in windows 1-N may be summed to form a first new window, and energies of windows (N+1)-(2N) may be summed to form a second new window, etc.

In block 804, the wireless device 102 compares the summed energies contained in the new windows to threshold values. The wireless device 102 classifies the channel, in block 806, based on the results of the comparisons. For example, the wireless device 102 may classify the channel based on the distance between the most distant new windows containing energy that exceeds the threshold.

Figure 9:
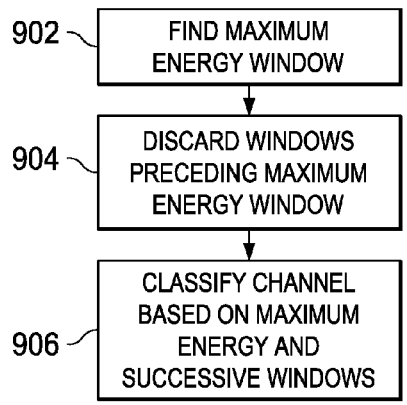
FIG. 9 shows a flow diagram for a method for channel classification based on window reordering and thresholding in accordance with various embodiments.

FIG. 9 shows a flow diagram for a method 900 for channel classification based on window reordering and thresholding in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 900, as well as other operations described herein, can be performed by the wireless device 102, or by a processor of the wireless device 102 executing instructions stored in a computer readable medium. The method 900 may be applied to classify a channel in blocks 512, 612 of methods 500, 600.

The method 900 adjusts the positioning of windows to account for scenarios in which the first window does not contain the highest energy of the windows (e.g., no direct path between device 108 and device 102). In block 902, the wireless device 102 evaluates the energy contained in each window, and identifies the window containing higher energy than any of the other windows, i.e., the maximum energy window. Each window may be identified by an index. The windows having indices lower than the index of the maximum energy window are discarded in block 904, and the discarded windows are not used to classify the channel.

The maximum window energy is deemed the first window for purposes of channel classification. In block 906, the wireless device 102 classifies the channel based on the maximum energy window and the windows following the maximum energy window (i.e., having higher indices). Threshold comparison and/or summation of adjacent windows may be applied to the maximum energy and successive windows as described in methods 700, 800.

Figure 10:
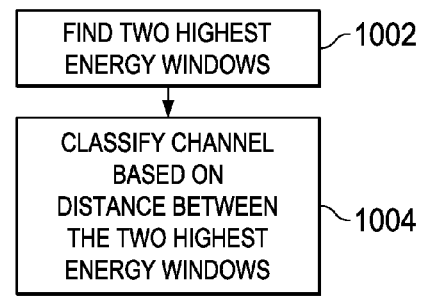
FIG. 10 shows a flow diagram for a method for channel classification based on maximum energy windows in accordance with various embodiments.

FIG. 10 shows a flow diagram for a method 1000 for channel classification based on maximum energy windows in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 1000, as well as other operations described herein, can be performed by the wireless device 102, or by a processor of the wireless device 102 executing instructions stored in a computer readable medium. The method 1000 may be applied to classify a channel in blocks 512, 612 of methods 500, 600.

In block 1002, the wireless device 102 evaluates the energy contained in each window, and identifies a first of the windows containing higher energy than any other of the windows (i.e., the maximum energy window), and identifies a second window containing higher energy than any other of the windows except the maximum energy window.

In block 904, the wireless device 102 determines the distance between the first and second windows. The distance is defined by the difference between phase rotator values of the two windows (e.g., differences between the indices of the two windows). The wireless device 102 classifies the channel based on the distance. For example, the distance between the windows may be compared to a series of thresholds corresponding to delay spread classes.

Frequency domain spreading can be applied to the BPSK or QPSK data symbols to allow the system to operate at a lower signal-to-noise ratio. A frequency domain spreading factor of 2 (FDS=2) replicates PSK symbols in the positive-numbers data subcarriers and copies them into the negative-numbered data subcarriers with pre-determined phase rotations which reduce the peak-to-average power ratio. A frequency domain spreading factor of 4 (FDS=4) replicates PSK symbols in the lower half of the positive-numbered data tones and copies them to the upper half of the positive-numbered data tones and the lower and upper halves of the negative-numbered data tones, again with pre-determined phase rotations applied to the replicated PSK symbols. The use of FDS requires the channel classifier to be able to operate at a lower SNR.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving, by a wireless device, an orthogonal frequency division multiplexed packet;
computing a channel estimate corresponding to a channel traversed by a packet between the wireless device and a source device;
partitioning the channel estimate into a plurality of windows, each window representing a range of time of the channel estimate; and
assigning a delay spread classification to the channel based on a distribution of energy over the windows.

2. The method of claim 1, wherein computing the channel estimate further comprises applying an inverse frequency transform to a frequency domain channel estimate corresponding to the channel.

3. The method of claim 1, wherein partitioning the channel estimate further comprises applying a plurality of phase rotations to the channel estimate;
wherein the channel estimate is a frequency domain channel estimate.

4. The method of claim 1, partitioning the channel estimate further comprises associating each coefficient of the channel estimate with a time value corresponding to the coefficient.

5. The method of claim 1, further comprising computing an energy for each window, the energy based on the channel estimate partitioned into the window.

6. The method of claim 5, wherein assigning a delay spread classification further comprises:
comparing the energy for each window to a predetermined threshold; and
assigning the delay spread classification based on distance between windows having energy that exceeds the threshold.

7. The method of claim 5, wherein assigning a delay spread classification further comprises:
summing the energies of a predetermined number of adjacent windows, thereby generating a plurality of accumulated windows;
comparing the energy for each accumulated window to a predetermined threshold; and
assigning the delay spread classification based on a distance between accumulated windows having energy that exceeds the threshold.

8. The method of claim 5, wherein assigning a delay spread classification further comprises:
identifying a maximum energy window of the plurality of windows, the maximum energy window having energy exceeding an energy of each other window of the plurality of windows;
generating a shifted window set, the shifted window set comprising only windows of the plurality of windows having a window index at least as high as the window index of the maximum energy window; and
assigning the delay spread classification based on windows of the shifted window set;
wherein a higher window index indicates a later time.

9. The method of claim 5, wherein assigning a delay spread classification further comprises:
identifying two highest energy windows of the plurality of windows, the two highest energy windows having a greater energy than any other pair of windows of the plurality of windows;
measuring a distance between the two highest energy windows; and
assigning the delay spread classification based on the distance.

10. The method of claim 5, wherein the partitioning further comprises applying a same filter function to the channel estimate rotated by a plurality of different phase rotations.

11. A system, comprising:
a wireless device, the wireless device configured to receive an orthogonal frequency division multiplexed packet via a wireless channel and to categorize the channel in terms of delay spread, the categorization based on symbols extracted from the packet, the wireless device comprising:
a channel classifier that performs the categorization, the channel classifier configured to:
compute, based on the symbols, a channel estimate;
partition the channel estimate into a plurality windows, each window representing a range of time of the channel estimate;
compute an energy level for each window; and
categorize the channel based on relative energy levels of the windows.

12. The system of claim 11, wherein the channel classifier is configured to convert the channel estimate from frequency domain to time domain, and to partition, compute energy level, and categorize based on the time domain channel estimate.

13. The system of claim 11, wherein the channel classifier is configured to:
apply a plurality of phase rotations to the channel estimate; and
apply a same filter to the plurality of phase rotated channel estimates to partition the channel estimate.

14. The system of claim 11, wherein the channel classifier is configured to:
compare the energy for each window to a predetermined threshold; and
assign the delay spread classification based on a distance between windows having energy that exceeds the threshold.

15. The system of claim 14, wherein the channel classifier is configured to:
sum the energies of a predetermined number of adjacent windows, thereby producing a reduced a number of windows; wherein the channel classifier performs the compare and assign using the reduced number of windows.

16. The system of claim 11, wherein the channel classifier is configured to categorize the channel based on relative energy levels of only a subset of windows starting at a window of the plurality of windows having the highest energy of the windows.

17. The system of claim 11, wherein the channel classifier is configured to categorize the channel based a distance between a highest energy level window of the plurality of windows and a second highest energy level window of the plurality of windows.

* * * * *